United States Patent
Wagner et al.

(10) Patent No.: US 8,245,689 B2
(45) Date of Patent: Aug. 21, 2012

(54) METHOD AND DEVICE FOR MONITORING CONTROL AND REGULATING LOOPS IN AN ENGINE SYSTEM

(75) Inventors: Horst Wagner, Niederstotzingen (DE); Daniel Kuhn, Pliezhausen-Ruebgarten (DE); Stefan Michael, Markgroeningen (DE); Wilhelm Blumendeller, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 12/251,738

(22) Filed: Oct. 15, 2008

(65) Prior Publication Data
US 2009/0101108 A1     Apr. 23, 2009

(30) Foreign Application Priority Data
Oct. 17, 2007  (DE) .......................... 10 2007 050 026

(51) Int. Cl.
*F02D 41/00*      (2006.01)
*G06F 7/00*       (2006.01)
*G06F 17/00*      (2006.01)
*F02B 47/08*      (2006.01)

(52) U.S. Cl. ........ 123/350; 123/316; 123/361; 123/564; 123/568.11; 701/103

(58) Field of Classification Search ............... 123/350, 123/316, 359, 361, 480, 564, 568.11; 701/103, 701/107, 114
See application file for complete search history.

(56) References Cited

U.S. PATENT DOCUMENTS

| | | | | |
|---|---|---|---|---|
| 5,606,119 A * | 2/1997 | Wallerand et al. | ......... | 73/114.11 |
| 5,936,792 A * | 8/1999 | Kobayashi et al. | ........ | 360/78.07 |
| 6,505,586 B1 * | 1/2003 | Sato et al. | .................. | 123/90.17 |
| 7,134,429 B2 * | 11/2006 | Mader et al. | .................. | 123/703 |
| 7,146,268 B2 * | 12/2006 | Wild et al. | .................... | 701/107 |
| 7,222,615 B2 * | 5/2007 | Buck et al. | ............... | 123/568.12 |
| 7,269,500 B2 * | 9/2007 | Cochet et al. | ................. | 701/114 |
| 7,308,877 B2 * | 12/2007 | Izumi et al. | ................. | 123/90.17 |
| 7,677,227 B2 * | 3/2010 | Sagisaka et al. | ........... | 123/559.1 |
| 2009/0038593 A1* | 2/2009 | Blumendeller | .......... | 123/568.12 |

* cited by examiner

*Primary Examiner* — Mahmoud Gimie
*Assistant Examiner* — David Hamaoui
(74) *Attorney, Agent, or Firm* — Kenyon & Kenyon LLP

(57) ABSTRACT

A method for monitoring a control loop or a regulating loop in a system, in particular in an engine system in a motor vehicle, is described. A characteristic value is ascertained from a preset value and a system variable of the regulating loop or the control loop during one or more state changes, and an error is detected as a function of the ascertained characteristic value.

23 Claims, 6 Drawing Sheets

METHOD AND DEVICE FOR MONITORING CONTROL AND REGULATING LOOPS IN AN ENGINE SYSTEM

CROSS REFERENCE

This application claims the benefit under 35 U.S.C. §119 of German Patent Application No. DE 102007050026.4 filed on Oct. 17, 2007, which is expressly incorporated herein by reference in its entirety.

FIELD OF THE INVENTION

The present invention relates to the monitoring of control and regulating loops in an engine system for the purpose of checking the quality or performance of the control system or regulating system during the operation of the engine system or in a diagnostic process. In particular, the present invention relates to a method for monitoring the function of an air mass regulating system, an EGR rate regulating system and/or a boost pressure regulating system in an engine system.

BACKGROUND INFORMATION

Exhaust gas recirculation regulating systems, boost pressure regulating systems, and air mass regulating systems are used for the emission-optimized operation of internal combustion engines. To avoid impairing emissions due to inadequate regulating performance, which may be caused by defects or aging, "on-board diagnostics" are implemented in the engine controller.

Errors may occur in systems in both steady states and in dynamic state transitions. A method for monitoring compliance with a permissible system deviation for steady operating states in regulating systems is conventional. However, this type of monitoring is often unable to identify error patterns which occur only during transient state changes.

SUMMARY

An object of the present invention is to provide a method and a device for monitoring regulating systems, in particular in an engine system, it being possible to detect, in particular, errors which are not detectable in steady operating states.

According to one example embodiment of the present invention, a method for monitoring a control loop or a regulating loop in a system, in particular in an engine system in a motor vehicle, is provided. According to the example method, a characteristic value is ascertained from a preset value and a system variable of the regulating loop or the control loop during one or more state changes, and an error is established as a function of the ascertained characteristic value.

The above method makes it possible to monitor whether, in regulating loops as well as in control loops, the system variable follows the preset value with a sufficient degree of accuracy when the preset value changes. For this purpose, the difference between the preset value and the system variable (the difference between the setpoint value and actual value in regulating systems) is mapped to a characteristic value during monitoring-relevant operating situations. As a function of this characteristic value, it is possible to establish whether or not the relevant regulating system or control system is working properly. In the case of improper functioning of the regulating system or the control system, the characteristic value thus indicates defective components and, in the case of an engine system, impairment of the emissions associated therewith. The above example method is applicable to both regulating systems and control systems, the control system only indirectly influencing the variable to be set.

Furthermore, the preset value may correspond to a setpoint value of a regulating system, and the system variable may correspond to an actual value of the regulating system. Alternatively, in the case of a control system, the preset value may correspond to an input variable of the control system, which provides a manipulated variable for the system, and the system variable may correspond to a system variable arising on the basis of the manipulated variable.

According to a preferred specific embodiment, the one or more state changes may be ascertained as a function of a gradient of the preset value, in particular if the absolute value of the gradient of the preset value exceeds a threshold value.

The characteristic value may also be integrated over a predetermined time, and the error may be established as a function of a result of the integration.

According to a specific embodiment, the characteristic value may be ascertained as a function of a distance variable, the distance variable indicating a measure of a distance between the curve of the preset values and the curve of the system variables.

In particular, the characteristic value may be ascertained as a function of a triangle area of a triangle, a first corner point of the triangle being defined as the system variable at a first point in time, a second corner point of the triangle being defined as the preset value at the first point in time, and a third corner point being defined as the preset value at a second point in time at which the preset value has assumed the value of the system variable at the first point in time.

It may be provided that the characteristic value is ascertained as a function of a convolution between the preset value and the system variable or between the gradient thereof.

Moreover, an adaptation variable may be ascertained as the characteristic value, the adaptation variable being empirically determined by adaptation to the system, in particular during the state change of a system model.

The system may correspond to one of the following regulating systems: a boost pressure regulating system, an air mass regulating system and an exhaust gas recirculation rate regulating system.

Moreover, a characteristic value may be ascertained from a preset value and a system variable of the regulating loop or the control loop exclusively during one or more state changes.

According to a further aspect, an example device for monitoring a control loop and a regulating loop in a system, in particular in an engine system in a motor vehicle, is provided. The example device is designed to ascertain a characteristic value from a preset value and a system variable during one or more state changes and to establish an error as a function of the ascertained characteristic value.

According to a further aspect, an engine system is provided with a regulating system and the aforementioned device.

According to a further aspect, a computer program is provided which includes a program code which, when executed on a data processing unit, carries out the aforementioned method.

BRIEF DESCRIPTION OF THE DRAWINGS

Preferred specific embodiments of the present invention are explained in greater detail below on the basis of the figures.

DETAILED DESCRIPTION OF EXAMPLE EMBODIMENTS

Figure 1:
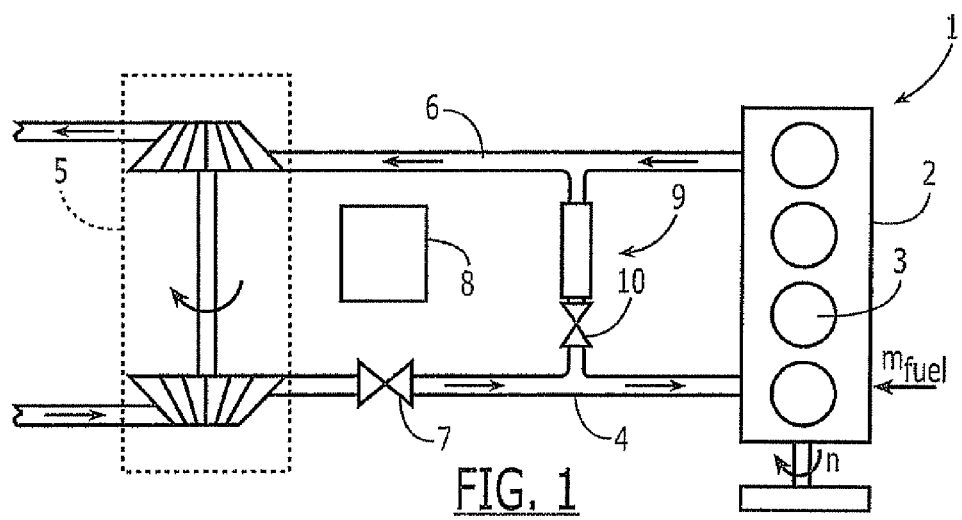
FIG. 1 shows an engine system in which multiple regulating loops may be provided which may be monitored according to a specific example embodiment of a method for monitoring the regulating loops.

FIG. 1 schematically depicts an engine system 1, showing an internal combustion engine 2 including four cylinders 3. An air flow is supplied to internal combustion engine 2 via an intake manifold 4. Internal combustion engine 2 is also connected to an exhaust gas section 6 for the purpose of removing combustion exhaust gases from cylinders 3. A charging device 5 is provided, which in the illustrated exemplary embodiment is designed as a turbocharger, which, for the purpose of increasing the intake manifold pressure, supplies air to intake manifold 4 driven by the exhaust gas flow of internal combustion engine 2 in exhaust gas section 6.

The air flow passing through intake manifold 4 is further controlled by a settable throttle valve 7. In addition to setting the throttle valve, an engine control unit 8 is also used to set the injection quantity and efficiency of the charging device. An exhaust gas recirculation system 9 is also provided to optimize emissions by setting an exhaust gas recirculation rate using a suitable position sensor 10. Position sensor 10 is also controlled by engine control unit 8.

Figure 2:
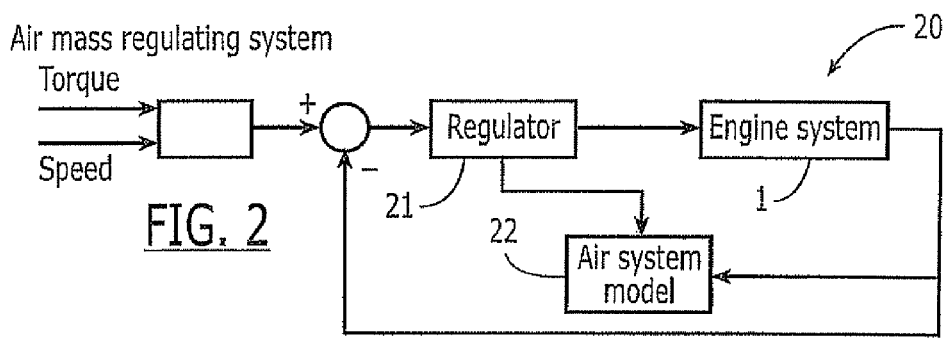
FIGS. 2 through 4 show schematic representations of an air mass regulating system, an exhaust gas recirculation rate regulating system and a boost pressure regulating system, respectively, for use in the engine system illustrated in FIG. 1.
Figure 3:
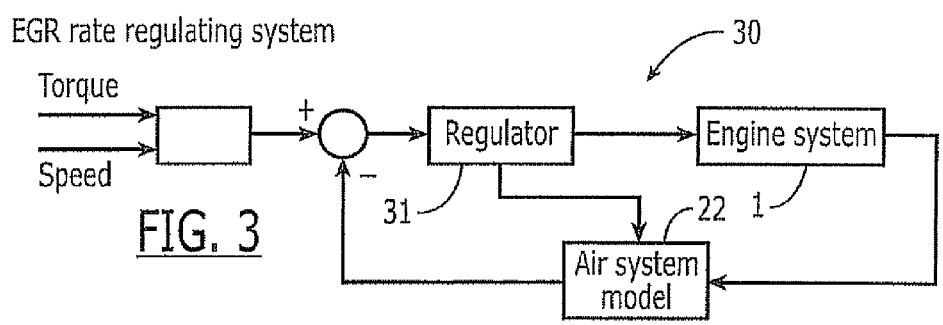
Figure 4:
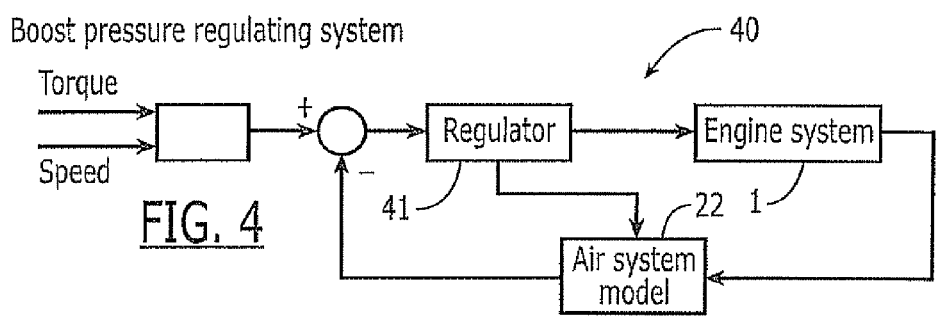

For example, an air mass regulating system, an exhaust gas recirculation rate regulating system and a boost pressure regulating system are provided in an engine system 1 of this type. However, the example method according to the present invention is not limited to an engine system shown in FIG. 1, but rather regulating systems in other engine systems, e.g., without an exhaust gas recirculation regulating system or without a charging device, may also be provided. In particular, the example method according to the present invention may be used for both diesel and spark ignition engines. FIGS. 2 through 4 schematically illustrate a block diagram of the regulating systems implemented in the engine system according to FIG. 1.

FIG. 2 shows a schematic representation of an air mass regulating system 20 for an internal combustion engine 2 in the engine system according to FIG. 1. Air mass regulating system 20 regulates the air mass flowing to cylinders 3 according to a predefined setpoint air mass derived from the predefined setpoint torque and the predefined setpoint speed. The throttle valve position and the position of position sensor 10, which determines the quantity of recirculated exhaust gas, are used as the manipulated variables of the regulating system output by air mass regulator 21. In the case of this air mass regulating system, the actual air mass to be regulated is measured or derived according to an air system model.

The schematic representation in FIG. 3 shows an exhaust gas recirculation rate regulating system 30, in which the appropriate exhaust gas recirculation regulator 31 sets the actual exhaust gas recirculation rate to a setpoint exhaust gas recirculation rate and, for this purpose, also outputs the throttle valve position and the position of position sensor 10 as manipulated variables. The air mass regulating system illustrated in FIG. 2 and the exhaust gas recirculation rate regulating system supply their manipulated variables to air system model 22, which makes it possible to ascertain the current actual exhaust gas recirculation rate as a function of the manipulated variables and as a function of instantaneous engine parameters.

FIG. 4 shows a boost pressure regulating system 40, in which the current actual boost pressure is regulated to a setpoint boost pressure determined by the setpoint torque and setpoint speed. As manipulated variables, corresponding boost pressure regulator 41 indicates a setting of the charging device which enables the efficiency of charging device 5 to be set. The efficiency setting as well as the air mass flow present in internal combustion engine 2 is also supplied to air system model 22, and the actual boost pressure, which corresponds to the pressure upstream from throttle valve 7, is estimated or ascertained therefrom.

The regulation systems described above are implemented by engine control unit 8, where they are implemented, for example, as a hardware circuit or a software program which is executed in a data processing unit provided in the engine control unit.

In general, the example method described below may be used for a regulation system and a control system in which the manipulated variable only indirectly influences the actual value to be monitored via a positioning system. However, the example method according to the present invention is described below on the basis of an engine system.

The example method according to the present invention is used to monitor the proper functioning of the regulating systems and control systems implemented in an engine system. The example methods described below provide one option for establishing the quality of performance of the regulating system in ranges of transient state changes, thereby making it possible to detect error types which have an effect only during state changes.

Figure 5:
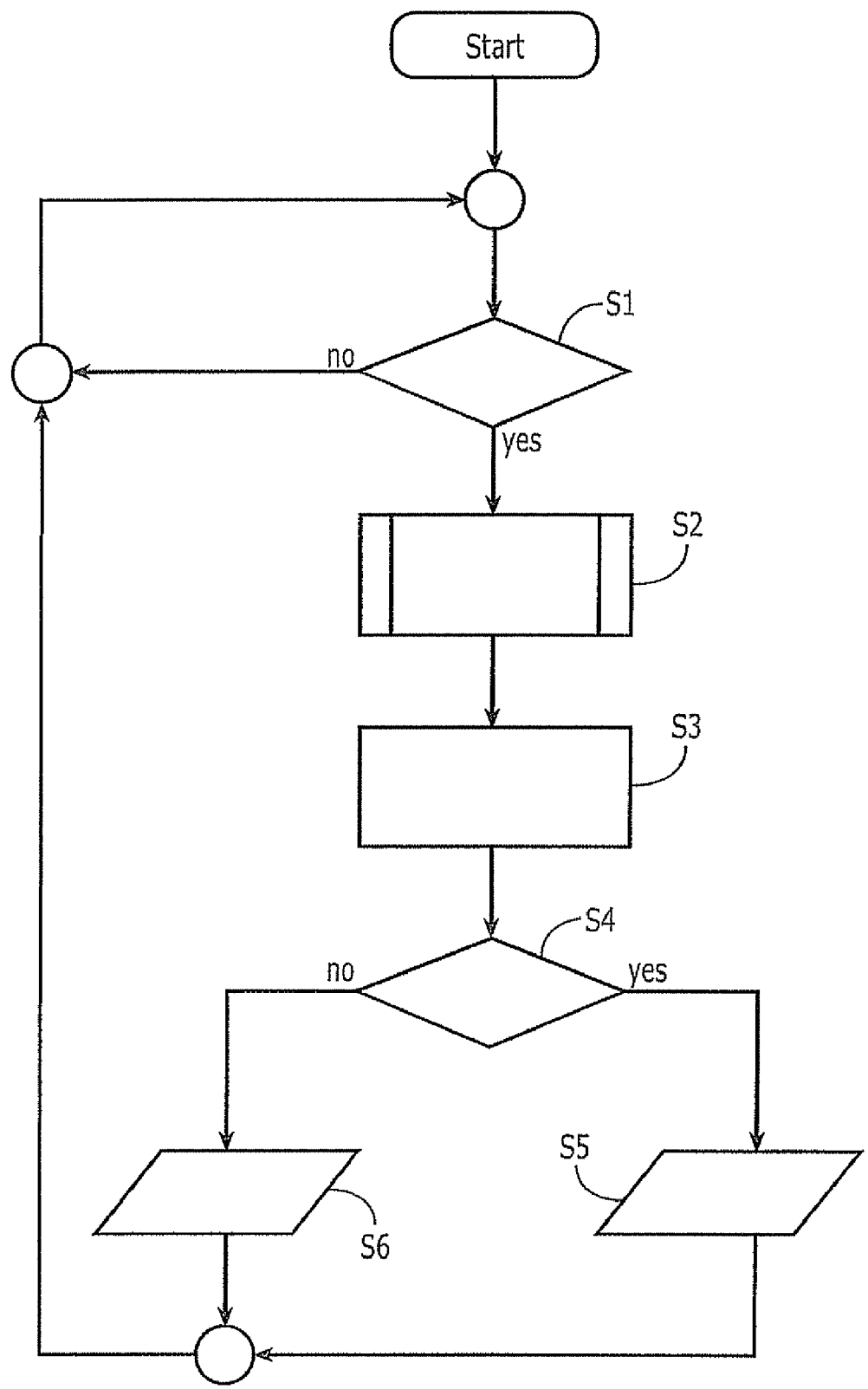
FIG. 5 shows a flow chart for illustrating the example method according to the present invention.

FIG. 5 shows a flow chart for testing a selected regulating system, for example one of the regulating systems illustrated in FIGS. 2 through 4. Since the error pattern of a delayed regulating behavior (untuned control behavior) is to be detected, an operating situation in which this error is apparent must be present for monitoring. Step S1 therefore first checks whether an operating situation which enables the detection of the error to be identified is present. Step S1 therefore checks whether the regulating system is in a state change in which a delayed regulating behavior is detectable. This is usually the case when the corresponding setpoint value changes, e.g., during an acceleration of internal combustion engine 2. For example, an enabling state, in which the above operating situation (the state change of the regulating system) is present, is defined as a state in which the regulating system is in a transient, i.e., dynamic, range, the setpoint value curve having a gradient whose absolute value is greater than a corresponding (predefined) first threshold value. A second threshold value may also be predefined, which indicates the maximum permissible absolute value of the gradient, so that, if the gradient of the setpoint value curve is greater than the second threshold value, the enabling state is canceled again. The enabling state is also cancelled if the absolute value of the gradient drops below the first threshold value.

If step S1 reveals that an operating situation of this type exists, a characteristic value is ascertained in a step 2 from the signal curves of the particular setpoint value and the particular actual value during the presence of the detected operating situation. A characteristic value of this type is determined in such a way that it may represent a measure of the quality performance for the regulating system behavior over time.

Depending on the desired robustness of the example method to be implemented, a monitoring time is defined during which ascertained characteristic values are accumulated and/or normalized (step S3) to reduce the relevance of individual outliers of the characteristic value.

Step S4 checks whether or not the ascertained characteristic value lies above a threshold value for detecting a corresponding error. Depending on the selected characteristic value, the error is detectable if the characteristic value drops below or exceeds the threshold value. For example, a detected error may be signaled in step S5 or displayed in another manner.

Depending on the range in which the characteristic value lies, adaptations may also be made to the regulation performance, e.g., by adapting regulation parameters, for the purpose of adapting the regulating system, for example, to aging of structural components or other influencing variables. A range of this type may be defined, for example, as a value range for the characteristic value which lies between the range in which an error is detected and the range in which the characteristic value indicates a proper functioning of the regulating system.

There are multiple ways in which the characteristic value may be ascertained for determining the regulation quality.

Figure 6:
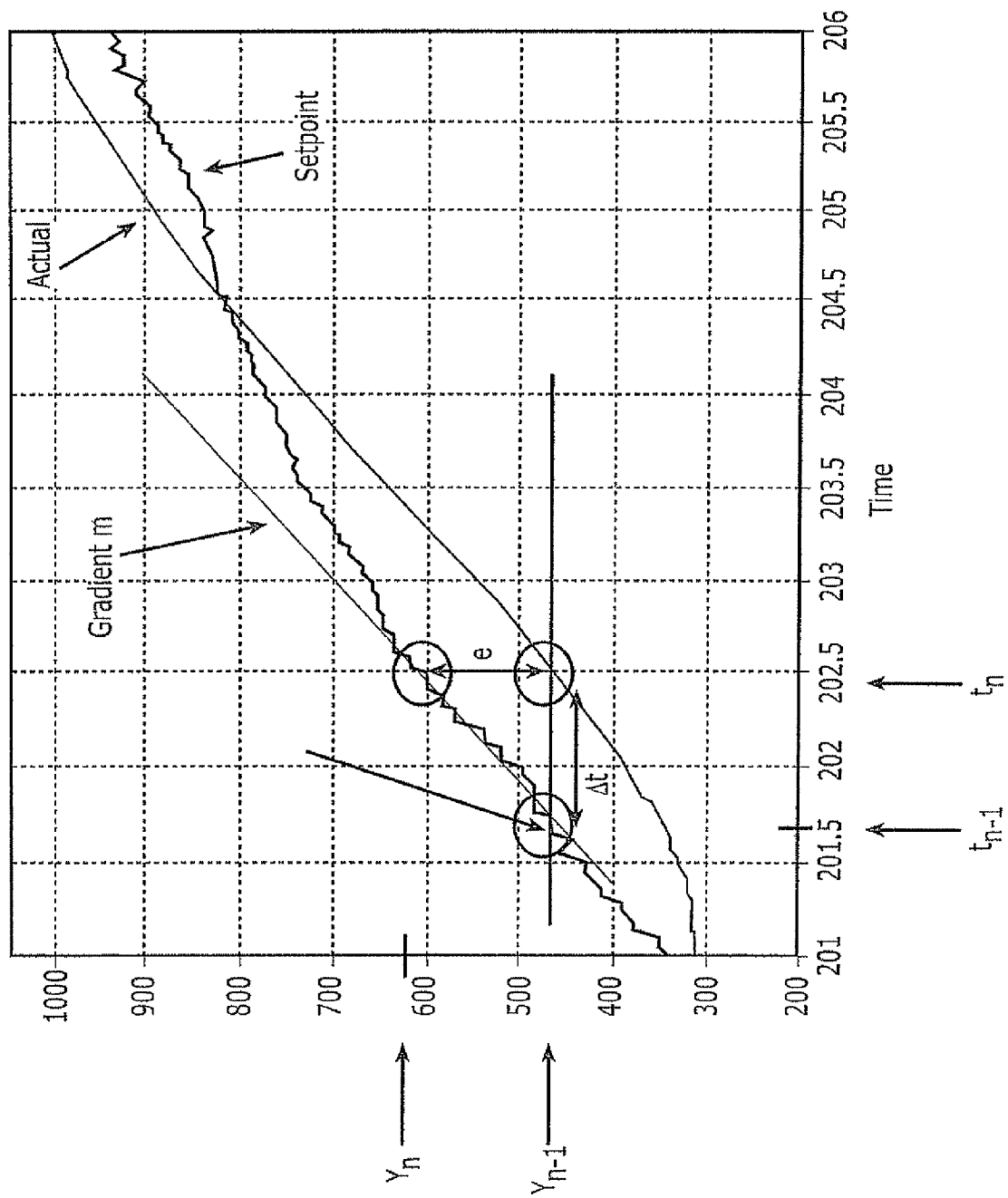
FIG. 6 shows a diagram for illustrating an example method for ascertaining the characteristic value according to a specific embodiment of the present invention.

In a first variant, a triangle area $A_{triangle}$ is calculated in a signal time diagram in the enabling state for the purpose of ascertaining the characteristic value in step S2 with regard to the instantaneous actual value, as shown graphically in FIG. 6. The first corner point of the triangle is formed by actual value $y_{actual}$ in question at a specified point in time $t_n$. A further corner point of the triangle results from setpoint value $y_{setpoint}$ at sampling time $t_n$ of actual value $y_{actual}$, and a third corner point results from a further point in time $t_{n-1}$ at which setpoint value $y_{setpoint}$ had the value of actual value $y_{actual}$. In other words, a triangle is ascertained which results from the distance of the characteristic curves, the time direction and the distance of the characteristic curves in the setpoint value direction in FIG. 6, i.e., in the y direction.

There are two time periods: a cycle time in which the algorithm is executed (e.g., in 100 ms intervals) and the time difference calculated via gradient m and regulation error e (e.g., 4 s). Since the time at which the setpoint value had the same absolute value as the actual value is unknown, a corresponding time difference $\Delta t$ is "approximately" determined via gradient m. For this purpose, gradient $m_{setpoint}$ of the setpoint is first calculated at point in time $t_n$ as follows:

$$m_{soll} = \frac{y_n - y_{n-1}}{t_n - t_{n-1}}$$

where $e_{diff} = y_n - y_{n-1}$ corresponds to the difference between a setpoint value at point in time $t_n$ and the setpoint value at a further point in time $t_{n-1}$, and $t_n - t_{n-1}$ corresponds to time difference $\Delta t$ between two scanning steps, e.g., 100 ms according to the cycle time. Gradient $m_{setpoint}$ and regulation error $e_{diff}$ may then be used to calculate $\Delta t$.

$\Delta t = e/m$ (approximately 4 s).

Therefore, to determine triangle area $A_{triangle}$, the system deviation between the setpoint value and actual value is calculated ($e_{diff} = y_{setpoint} - y_{actual}$) and gradient $m_{setpoint}$ of setpoint value $y_{setpoint}$ at point in time $t_n$ is calculated using an adjacent point resulting from the time difference.

To determine triangle area $A_{triangle}$, the absolute value of the system deviation is preferably formed for the purpose of taking into account overshooting, i.e., system states in which the actual value is greater than the setpoint value. The triangle area is determined as follows:

$$A_{triangle} = \frac{1}{2} |e_{diff}| \Delta t = \frac{1}{2} (e_{diff})^2 \cdot \frac{1}{m_{setpoint}}$$

It may be provided that the example method is made more robust by integrating this triangle area over a time period. This time period may include one or more enabling cycles. If the enabling cycle or one of multiple enabling cycles is/are provided for a predefined minimum enabling time period, the area integral is divided by the cumulative enabling time and compared with a limiting value according to step S4. If the area integral divided by the cumulative enabling time exceeds the predefined limiting value in step S4, an error is detected. If the area integral divided by the cumulative enabling time drops below the predefined limiting value in step S4, an error is not detected. Finally, in both cases, the enabling times and the value of the area integral are reset.

According to a further method, a characteristic value of this type may also be implemented by convolution between possibly processed signal curves of the setpoint value and actual value. A cross-correlation may be preferably used as the convolution of the setpoint value and actual value curves. The value of the independent convolution variable at which the cross-correlation achieves its maximum represents the delay or shift between the setpoint value curve and the actual value curve. The maximum of the correlation function represents the characteristic value and is a measure of the trustworthiness of the result. If an algorithm of this type is used, the check of whether monitoring is enabled may also be carried out on the basis of the correlation maximum according to step S1.

$$E(setpoint_m) = \frac{1}{N-m} \cdot \sum_{n=1}^{N-m} Xsetpoint_n$$

$$E(Xactual_m) = \frac{1}{N-m} \cdot \sum_{n=m+1}^{N} Xactual_n$$

$$R_m = \frac{1}{N-m} \cdot \sum_{n=1}^{N-m} (Xactual_{n+m} - E(Xactual_m)) \cdot (Xsetpoint_n - E(Xsetpoint_m))$$

In this case, E corresponds to the expected value of a variable N of the length of the measured vector, $X_{setpoint}$ to the setpoint value, $X_{actual}$ to the actual value and R to the convolution sum. Convolution sum R represents the characteristic value, which represents the regulation performance in the sense of the present invention.

As an alternative to the cross-correlation of the setpoint value curves and actual value curves, a cross-correlation of the gradients of these curves may be used as the characteristic value in the sense of the present invention.

$$E(dXsetpoint_m) = \frac{1}{N-m} \cdot \sum_{n=1}^{N-m} Xsetpoint_n$$

$$E(dXactual_m) = \frac{1}{N-m} \cdot \sum_{n=m+1}^{N} dXactual_n$$

$$R_m = \frac{1}{N-m} \cdot$$

$$\sum_{n=1}^{N-m} (dXactual_{n+m} - E(dXactual_m)) \cdot (dXsetpoint_n - E(dXsetpoint_m))$$

Figure 7A:
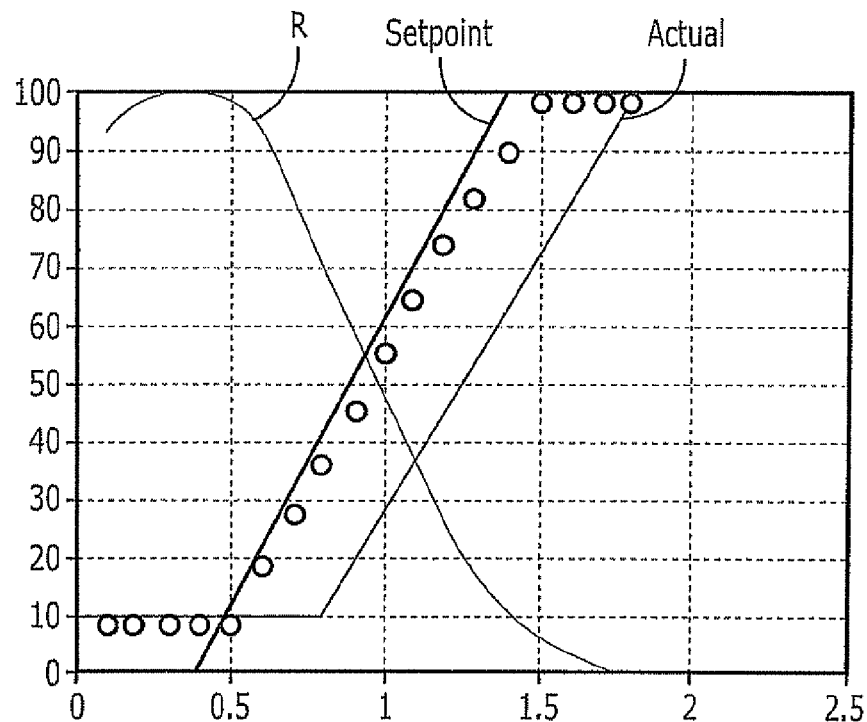
FIGS. 7A and 7B show diagrams of the curve of a convolution value as the characteristic value as a function of the output variables in the case of calculation.
Figure 7B:
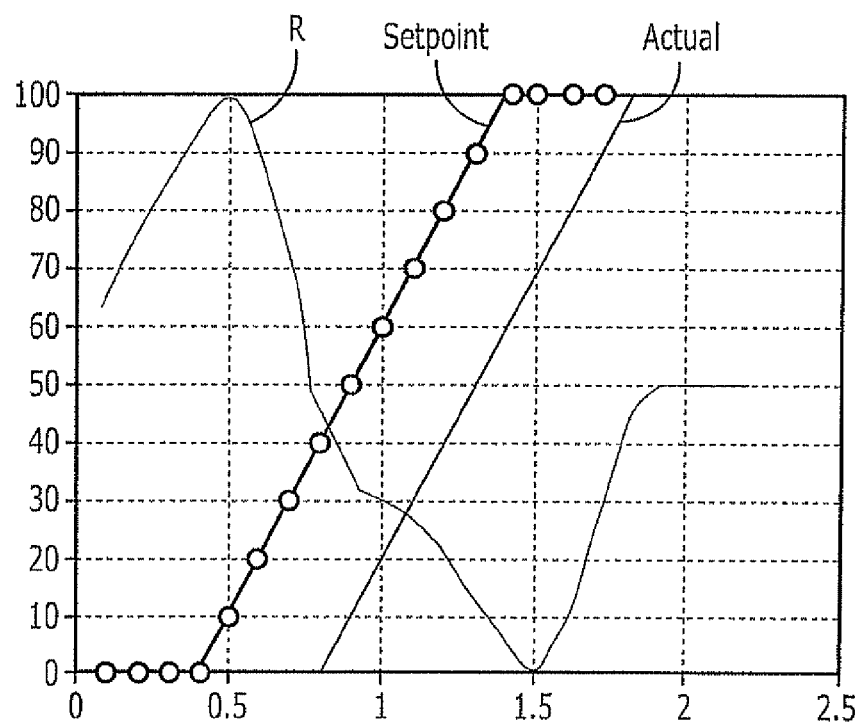

FIG. 7A shows the curve of the convolution sum in the case of the cross-correlation of the setpoint value curve and the actual value curve, and FIG. 7B shows the curve of the convolution sum if the gradients of these curves are used.

Figure 8:
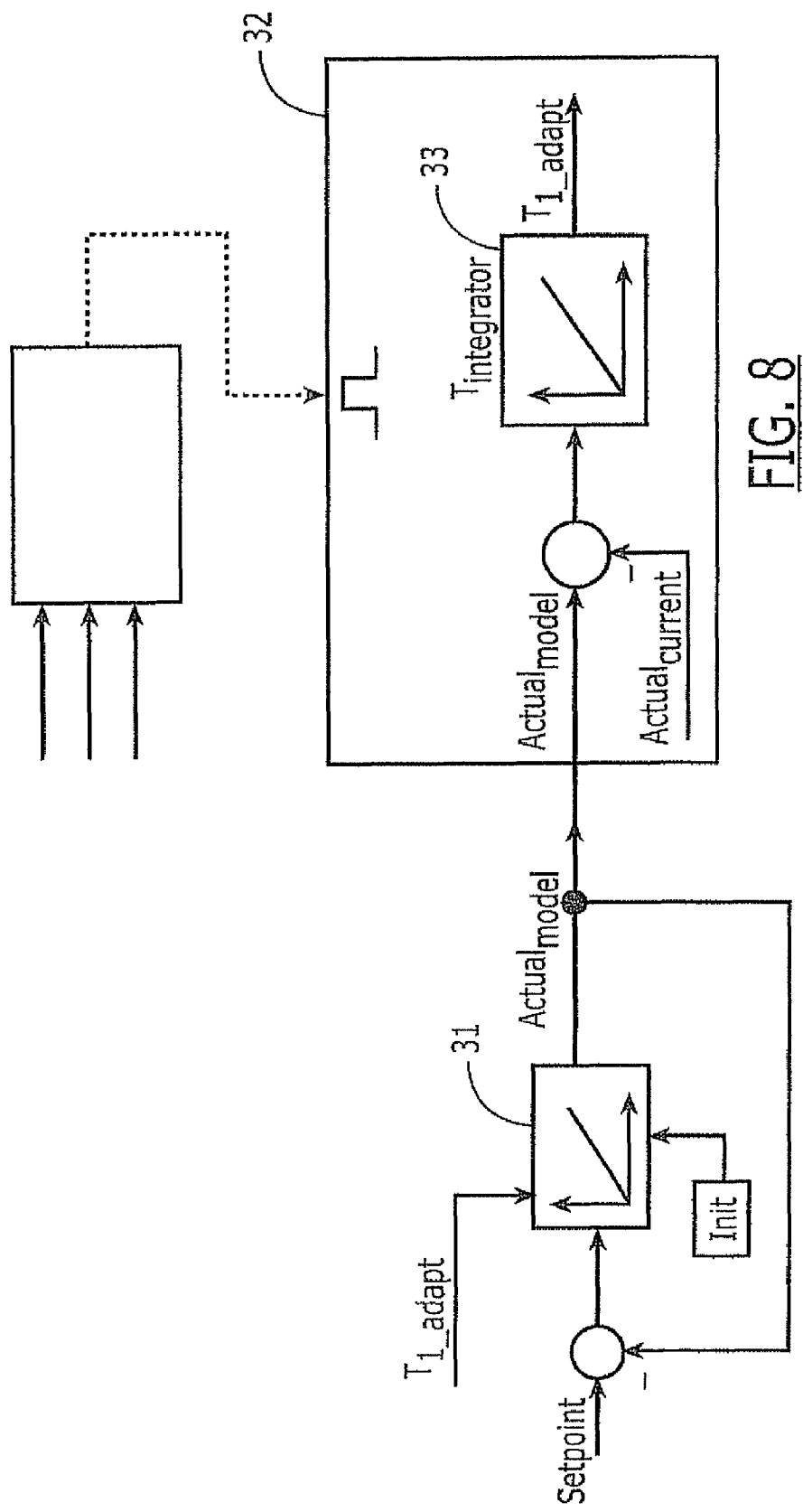
FIG. 8 shows a block diagram for representing an adaptation for ascertaining the time constants as the characteristic value.

According to a further specific embodiment, the characteristic value of step S2 may also be ascertained from the comparison between adapted regulation parameters of a system model and the expected parameters for an intact controlled system. For this purpose, the controlled system is modeled, for example with the aid of a first-order time-delay element 31, as illustrated in FIG. 8. In particular, a time constant of the time-delay element may be used as a characteristic value in the sense of step S2. The input variable of the system model is setpoint value Setpoint, as for example the air mass, and the output variable of the system model corresponds to PT1 delayed model actual value $Actual_{model}$. The system model includes an integrator as time-delay element 31, which is initialized whenever the enabling state is assumed. During initialization, the start value of the integrator is set to current actual value $Actual_{current}$, i.e., the instantaneously detected actual variable, such as the instantaneously present air mass in the example assumed above.

The system model is then adapted by adapting time constant $T_{1\_adapt}$ of time-delay element 31 in an adaptation element 32, so that the curve of actual values $Actual_{model}$ determined by the system model and corresponding instantaneous time constant $T_{1\_adapt}$ and the curve of the current actual values correspond to each other as closely as possible.

Time constant $T_{1\_adapt}$ of the integrator of the system model is ascertained therefrom. The error difference between modeled actual value $Actual_{model}$ and current actual value $Actual_{current}$ is integrated in a further integrator 33. The output variable of further integrator 33 corresponds to adapted time constant $T_{1\_adapt}$ for the PT1 model of time-delay element 31. The higher the setting of an integration time constant $T_{integrator}$ of further integrator 33, the slower, and yet also the more robust, the adaptation of time constant $T_{1\_adapt}$.

Figure 9:
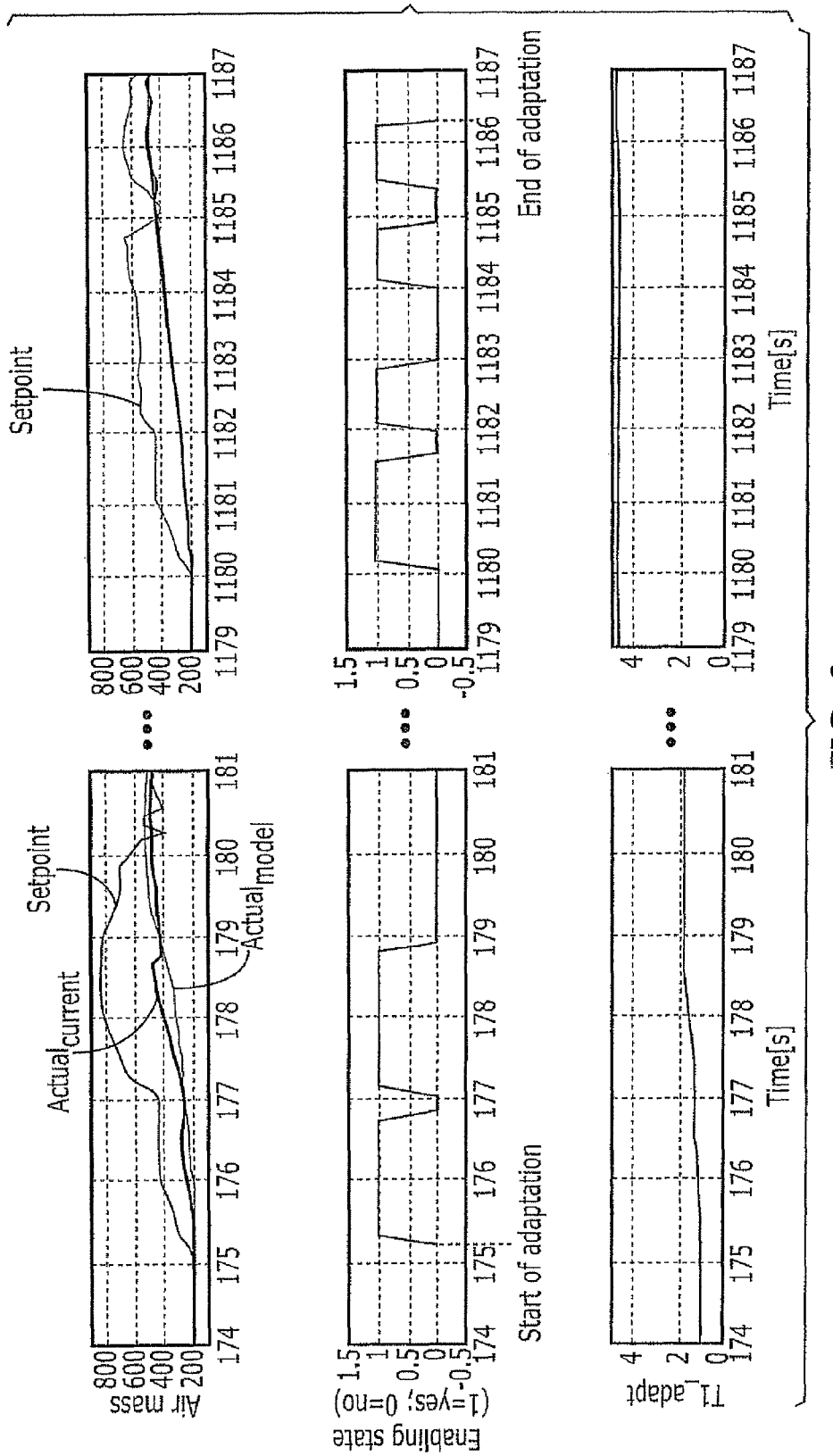
FIG. 9 shows an example of the curve of an adaptation for ascertaining the time constants as the characteristic value according to the method illustrated in FIG. 8.

FIG. 9 shows the curves of the setpoint value as well as of effective current actual value $Actual_{current}$ as well as the curves of modeled actual value $Actual_{model}$ as well as the curve of the adaptation time constant during the adaptation. The curves show a section of the adaptation curve at the beginning of the adaptation (left side) and a section of the adaptation curve at the end of the adaptation (right side). The adaptation time constant of the model on which the effective regulation system is based may also be used to detect an excessively slow system. This is detected if the time constant ascertained in this manner is greater than a specified threshold value after the adaptation is complete.

The example methods described above for ascertaining the characteristic value may be applied in a similar manner to control systems in which the manipulated value of the control system only indirectly influences the actual variable, i.e., not exclusively or via a system behavior. This is the case, for example, in control systems based on a characteristics map which is adapted to the instantaneous engine parameters. When engine components age, the generally inflexible characteristics map may result in differences between the manipulated variables of the control systems.

What is claimed is:

1. A method for monitoring a control loop or a regulating loop in an engine system in a motor vehicle, the method comprising:
    identifying at least one state change occurring during ongoing operation of the motor vehicle by comparing, with an electronic processor, an absolute value of a gradient of a first parameter to determine if it exceeds a first threshold;
    identifying a steady operating state occurring during ongoing operation of the motor vehicle by comparing, with the electronic processor, an absolute value of a gradient of the first parameter to determine if it is at or below the first threshold;
    ascertaining, with the electronic processor, a characteristic value representing a measure of the performance of the control loop or regulating loop from a preset value and a resulting system variable only during the one or more state changes; and
    identifying an error as a function of the ascertained characteristic value exceeding an error threshold during the one or more state changes and outputting an indication that an engine system component is defective in response to the error;
    wherein the characteristic value is ascertained as a function of a triangle area of a triangle, a first corner point of the triangle being defined as the system variable at a first point in time, a second corner point of the triangle being defined as the preset value at the first point in time, and a third corner point being defined as the preset value at a second point in time at which the preset value has assumed a value of the system variable at the first point in time, and
    wherein the function of at least one of an air mass regulating system, an EGR rate regulating system, and a boost pressure regulating system in an engine system is monitored.

2. The method as recited in claim 1, wherein the preset value corresponds to a setpoint value of the first parameter, and the system variable corresponds to an actual value of the first parameter.

3. The method as recited in claim 1, wherein the preset value corresponds to an input variable of a control system, which provides a manipulated variable for the system, and the system variable corresponds to a system variable arising based on the manipulated variable.

4. The method as recited in claim 1, wherein the one or more state changes are ascertained as a function of a gradient of the preset value particular if an absolute value of a gradient of the preset value exceeds a threshold value.

5. The method as recited in claim 1, wherein the characteristic value is integrated over a predetermined time, and the error is established as a function of a result of the integration.

6. The method as recited in claim 1, wherein the characteristic value is ascertained as a function of a distance variable, the distance variable indicating a measure of a distance between a curve of preset values and the curve of the system variable.

7. The method as recited in claim 6, wherein the characteristic value is ascertained as a function of a convolution value between the preset value and the system variable or between its gradients.

8. The method as recited in claim 1, wherein an adaptation variable is ascertained as the characteristic value, the adaptation variable being empirically determined by adaptation to the system during a state change of a system model.

9. The method as recited in claim 1, wherein the system corresponds to a boost pressure regulating system, an air mass regulating system, and an exhaust gas recirculation rate regulating system.

10. The method as recited in claim 1, wherein the preset value corresponds to a setpoint value of a regulating system, and the system variable corresponds to an actual value of the regulating system, and wherein the one or more state changes are ascertained as a function of a gradient of the preset value particular if an absolute value of a gradient of the preset value exceeds a threshold value.

11. The method as recited in claim 10, wherein the characteristic value is integrated over a predetermined time, and wherein the error is established as a function of a result of the integration.

12. The method as recited in claim 10, wherein the characteristic value is ascertained as a function of a distance variable, the distance variable indicating a measure of a distance between a curve of preset values and the curve of the system variable.

13. The method as recited in claim 1, wherein the preset value corresponds to an input variable of a control system, which provides a manipulated variable for the system, and the system variable corresponds to a system variable arising based on the manipulated variable, and wherein the one or more state changes are ascertained as a function of a gradient of the preset value particular if an absolute value of a gradient of the preset value exceeds a threshold value.

14. The method as recited in claim 13, wherein the characteristic value is integrated over a predetermined time, and the error is established as a function of a result of the integration.

15. The method as recited in claim 13, wherein the characteristic value is ascertained as a function of a distance variable, and wherein the distance variable indicating a measure of a distance between a curve of preset values and the curve of the system variable.

16. The method as recited in claim 6, wherein the characteristic value is ascertained as a function of a convolution value between the preset value and the system variable or between its gradients, wherein an adaptation variable is ascertained as the characteristic value, the adaptation variable being empirically determined by adaptation to the system during a state change of a system model, and wherein the system corresponds to a boost pressure regulating system, an air mass regulating system, and an exhaust gas recirculation rate regulating system.

17. The method as recited in claim 1, wherein a characteristic value is ascertained from a preset value and a system variable of the regulating loop or of the control loop exclusively during one or more state changes, wherein an adaptation variable is ascertained as the characteristic value, the adaptation variable being empirically determined by adaptation to the system during a state change of a system model, and wherein the system corresponds to a boost pressure regulating system, an air mass regulating system, and an exhaust gas recirculation rate regulating system.

18. The method as recited in claim 1, wherein the area of the triangle is calculated by dividing the squared difference at a certain point in time by the doubled gradient in this point in time.

19. The method as recited in claim 1, wherein the to determine triangle area $A_{triangle}$, the system deviation between the setpoint value and actual value is calculated ($e_{diff}=y_{setpoint}-Y_{actual}$) and gradient $m_{setpoint}$ of setpoint value $y_{setpoint}$ at point in time $t_n$ is calculated using an adjacent point resulting from the time difference.

20. The method as recited in claim 1, wherein to determine triangle area $A_{triangle}$, the absolute value of the system deviation is formed to take into account overshooting, in which system states occur in which the actual value is greater than the setpoint value, so that the triangle area is determined as follows:

$$A_{triangle} = \frac{1}{2}|e_{diff}|\Delta t = \frac{1}{2}(e_{diff})^2 \cdot \frac{1}{m_{setpoint}}.$$

21. A device for monitoring control loops and regulating loops in an engine system in a motor vehicle, comprising:
an electronic processor which is adapted to perform the following:
monitoring an operating state in order to identify a transitioning operating state, the monitoring including comparing a gradient of a first parameter to determine if it exceeds a first threshold value;
monitoring an operating state in order to identify a steady operating state by comparing a gradient of the first parameter to determine if it is at or below the first threshold; and
responsive to the transitioning operating state, ascertaining a characteristic value representing a measure of the performance of the control loop or regulating loop from a preset value and a system variable, establishing an error as a function of the ascertained characteristic value as compared to an error threshold and outputting an indication that an engine system component is defective in response to the error;
wherein the characteristic value is ascertained as a function of a triangle area of a triangle, a first corner point of the triangle being defined as the system variable at a first point in time, a second corner point of the triangle being defined as the preset value at the first point in time, and a third corner point being defined as the preset value at a second point in time at which the preset value has assumed a value of the system variable at the first point in time, and
wherein the function of at least one of an air mass regulating system, an EGR rate regulating system, and a boost pressure regulating system in an engine system is monitored.

22. An engine system having a regulating system, comprising:
a device for monitoring control loops and regulating loops in an engine system in a motor vehicle, the device including an electronic processor which performs the following:
monitoring an operating state in order to identify transitioning operating state, the monitoring including comparing a gradient of a first parameter to determine if it exceeds a first threshold value;

monitoring an operating state to identify a steady operating state by comparing a gradient of the first parameter to determine if it is at or below the first threshold; and responsive to the transitioning operating state, ascertaining a characteristic value from a preset value and a system variable, establishing an error as a function of the ascertained characteristic value as compared to an error threshold and outputting an indication that an engine system component is defective in response to the identification of the error;

wherein the characteristic value is ascertained as a function of a triangle area of a triangle, a first corner point of the triangle being defined as the system variable at a first point in time, a second corner point of the triangle being defined as the preset value at the first point in time, and a third corner point being defined as the preset value at a second point in time at which the preset value has assumed a value of the system variable at the first point in time, and wherein the function of at least one of an air mass regulating system, an EGR rate regulating system, and a boost pressure regulating system in an engine system is monitored.

23. A non-transitory storage device having a computer program, which is executable by a processor, comprising:

a program code arrangement having program code for monitoring control loops and regulating loops in an engine system in a motor vehicle by performing the following:

identifying one or more state changes by comparing, with an electronic processor, an absolute value of a first parameter to determine if it exceeds a first threshold;

identifying a steady operating state occurring during ongoing operation of the motor vehicle by comparing, with the electronic processor, an absolute value of the first parameter to determine if it is at or below the first threshold;

ascertaining a characteristic value from a preset value and a resulting system variable only during the one or more state changes in an engine system of a motor vehicle; and identifying an error as a function of the ascertained characteristic value exceeding an error threshold during the one or more state changes and outputting an indication that an engine system component is defective in response to the identification of the error;

wherein the characteristic value is ascertained as a function of a triangle area of a triangle, a first corner point of the triangle being defined as the system variable at a first point in time, a second corner point of the triangle being defined as the preset value at the first point in time, and a third corner point being defined as the preset value at a second point in time at which the preset value has assumed a value of the system variable at the first point in time, and wherein the function of at least one of an air mass regulating system, an EGR rate regulating system, and a boost pressure regulating system in an engine system is monitored.

* * * * *